United States Patent
Lingman et al.

(10) Patent No.: US 8,321,116 B2
(45) Date of Patent: Nov. 27, 2012

(54) SYSTEM FOR CONTROLLING A FOUNDATION BRAKE OF A VEHICLE

(75) Inventors: Peter Lingman, Hindås (SE); Andreas Johnsson, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 609 days.

(21) Appl. No.: 12/160,109

(22) PCT Filed: Dec. 18, 2006

(86) PCT No.: PCT/SE2006/001432
§ 371 (c)(1),
(2), (4) Date: Mar. 19, 2009

(87) PCT Pub. No.: WO2007/078230
PCT Pub. Date: Jul. 12, 2007

(65) Prior Publication Data
US 2009/0203498 A1    Aug. 13, 2009

(30) Foreign Application Priority Data
Jan. 4, 2006  (SE) ..................... 0600025

(51) Int. Cl.
*B60K 31/04* (2006.01)

(52) U.S. Cl. ............... 701/96; 180/179; 701/70; 701/93
(58) Field of Classification Search .............. 701/70, 701/93, 96, 91, 92, 94; 180/170
See application file for complete search history.

(56) References Cited

U.S. PATENT DOCUMENTS

| 4,522,280 | A | 6/1985 | Blaney |
| 6,310,545 | B1 * | 10/2001 | Sapir ............................ 340/453 |
| 6,536,408 | B1 * | 3/2003 | Warner ......................... 123/323 |
| 2003/0158648 | A1 * | 8/2003 | Kubota et al. .................. 701/96 |

OTHER PUBLICATIONS

International Search Report from corresponding International Application No. PCT/SE2006/001432.

* cited by examiner

*Primary Examiner* — Lesley D Morris
*Assistant Examiner* — Jacob Knutson
(74) *Attorney, Agent, or Firm* — WRB-IP LLP

(57) ABSTRACT

A system for controlling a foundation brake of a vehicle. The system includes an adaptive cruise control (ACC) device, an arrangement to detect or predict excessive use of the foundation brake and an arrangement to disengage the ACC device on detection of excessive use of the foundation brake of the vehicle.

22 Claims, 2 Drawing Sheets

SYSTEM FOR CONTROLLING A FOUNDATION BRAKE OF A VEHICLE

BACKGROUND AND SUMMARY

The present invention concerns a system for controlling a foundation brake of a vehicle. The present invention also concerns a method for protecting a foundation brake. The invention is intended for use particularly, but not exclusively, in trucks, buses and heavy good vehicles but is applicable to any other vehicle such as a passenger car.

The brake system of a vehicle usually comprises a foundation brake. The foundation brake is the basic drum or disc brake assembly fitted to each axle or wheel which produces the braking force necessary to bring the vehicle to a stop. A vehicle may further comprise an adaptive cruise control (ACC) device that automatically adjusts the vehicle's speed to maintain a safe following distance. An ACC device usually utilizes a radar, installed behind the grill of the vehicle, to detect the speed and distance of any vehicle ahead of it. If the lead vehicle slows down the ACC device sends a signal to the engine or braking system of the vehicle to decelerate. Then, when the road is clear, the ACC device re-accelerates the vehicle back to a pre-set speed.

If a foundation brake is used excessively, such as if it is applied several times over a prolonged period of time, fatigue or fading, i.e. gradual or sudden loss of braking power, may occur. If brake pads are used excessively their optimal working temperature is exceeded and their coefficient of friction decreases since, at a certain temperature, certain elements of a brake pad can start to melt and vapourise. The vapour becomes trapped between the brake pad and the rotor surface causing the brake pad to hydroplane on a boundary layer of vaporized friction material which acts like a lubricant. Additional brake pedal pressure is then required to slow down the vehicle, which increases braking temperatures and further destroys the brake pad, resulting in further losses of braking power. At temperatures of approximately 600-800° C. the friction coefficient of the friction material can be reduced by approximately 60%. At temperatures of approximately 900° C. brake pads can start to burn. Heat generated in the brake pads may be dissipated using a cooling system; however the amount of heat that may be effectively dissipated by the cooling system is limited.

In order to protect a foundation brake many vehicles are equipped with a supplementary auxiliary brake. US patent application no. 2004/0119333 discloses a system for controlling the brakes of a commercial vehicle. The system includes an ACC device that modulates an urgency signal based upon a hazard variable such as the relative speed of, and/or distance to a vehicle traveling in front of said commercial vehicle. The commercial vehicle comprises an electronically controlled brake system, which is designed to distribute a desired amount of braking force to a friction brake system, i.e. a foundation brake, and an auxiliary brake, namely a retarder. A retarder is a device that is permanently fitted to the vehicle's engine or transmission to augment the vehicle's braking capability during prolonged brake application. The electronically controlled brake system is designed in such a way that the distribution of the desired braking force to the friction brake system and the retarder is also based upon the urgency signal.

Such a supplementary auxiliary brake may be used to protect a foundation brake and give the driver greater control and improved brake performance. However, an auxiliary brake such as a retarder, increases the cost, weight and space requirements of a vehicle's brake system and decreases the fuel efficiency of the vehicle.

It is desirable to control the foundation brake of a vehicle so as to protect the foundation brake in a simple and cost-effective way.

According to an aspect of the present invention, a system comprises an ACC device and means to detect or predict excessive use of the foundation brake. The system also comprises means to disengage, i.e. de-activate, disconnect or switch off the ACC device on detection or prediction of excessive use of the foundation brake. By disengaging the ACC device and thus transferring control of the foundation brake solely to the driver of the vehicle in situations where an ACC device may cause a foundation brake to be used excessively, fading and fatigue of the foundation brake is reduced or avoided. An ACC device may therefore be used together with a foundation brake without damaging the foundation brake of a vehicle. Furthermore, a supplementary auxiliary brake or retarder can be used together with a foundation brake in an ACC device without damaging the foundation brake of a vehicle.

According to an embodiment of the invention the system comprises means to determine the temperature of the foundation brake i.e. it comprises means to measure or calculate the temperature of at least one part of the foundation brake or the temperature of a component in the vicinity of the foundation brake. The system comprises means to disengage the ACC device if/when the temperature of the foundation brake reaches or exceeds a predetermined temperature, such as a temperature in the range 300-600° C. Said predetermined temperature will vary depending on the type of brake and/or brake pads used.

According to another embodiment of the invention the system comprises means to determine a brake duration factor (BD) of the foundation brake during a predetermined time interval and means to disengage the ACC device if/when the brake duration factor of the foundation brake reaches or exceeds a predetermined brake duration factor maximum limit. Said brake duration factor (BD) is dependent on the use of the foundation brake, i.e. the brake duration, during a predetermined time interval.

According to a further embodiment of the invention the system comprises means to determine whether the vehicle is at a safe distance behind any object in front of said vehicle, such as another vehicle, and means to disengage the ACC device only if/when the distance between the vehicle and any object in front of said vehicle corresponds to, or exceeds a predetermined safe distance. Not only is the foundation brake thereby protected, but the safety of the driver of the vehicle and other road users is ensured. The magnitude of the safe distance depends on the speed of the vehicle and may be calculated by the inventive system or obtained from pre-computed values that are stored in the inventive system. According to an embodiment of the invention the system comprises means to decrease the speed of the vehicle until said predetermined safe distance has been achieved.

According to another embodiment of the invention the system comprises indication means to inform the driver that the ACC device is being or has been disengaged. Said indication means provides an optic and/or audio and/or tactile signal for example.

According to a further embodiment of the invention the system comprises means, such as a road surface inclination sensor or pre-programmed route profile information or a global positioning system (GPS), to determine whether the vehicle is approaching a situation in which the use of the ACC device may result in excessive use of the foundation brake; for example means to determine whether the vehicle is about to follow a lead vehicle down a long descent.

The present invention also concerns a method for protecting a foundation brake of a vehicle comprising an ACC device. The method comprises the steps of determining whether the foundation brake is being used excessively and disengaging the ACC device if this is the case.

According to an embodiment of the invention the method comprises the step of determining the temperature of the foundation brake, directly or indirectly, and disengaging the ACC device if said temperature reaches or exceeds a predetermined temperature.

According to another embodiment of the invention the method comprises the step of determining a brake duration factor (BD) of the foundation brake and disengaging the ACC device if said brake duration factor reaches or exceeds a predetermined brake duration factor limit. Said brake duration factor limit depends on the use of the brakes during a predetermined time interval. According to an embodiment of the invention, the brake duration factor BD when the vehicle is braking, i.e. the foundation brakes are used to brake the vehicle, is determined using the expression:

$$BD(t) = \int_{t1}^{t} dt + BD(t_1) \quad (1)$$

The brake duration factor BD when the vehicle is not braking, i.e. the foundation brakes are not used to brake the vehicle, is determined using the expression:

$$BD(t) = a\int_{t1}^{t} dt + BD(t_1) \quad (2)$$

The constant a is less than or equal to 1. In this embodiment, BD is thus a variable that increases with slope 1 when the foundation brakes are used to brake the vehicle and decreases with slope a when the foundation brakes are not used.

According to another embodiment of the invention the brake duration factor (BD) is defined by the expression:

$$BD(t) = c\int_{t1}^{t} dt + BD(t_1) \quad (3)$$

where c is a function dependent on one or more of the following: vehicle speed, brake pressure, brake disc temperature, ambient temperature, type of brake disc, type of brake pads.

According to a further embodiment of the invention the method comprises the step of determining whether the vehicle is at a safe distance behind any object in front of said vehicle and disengaging the ACC device if/when the distance between said vehicle and said object corresponds to, or exceeds a predetermined safe distance. The ACC device is therefore not disengaged automatically as soon as excessive use of the foundation brake is detected or predicted but at a time thereafter when it is safe to do so. According to a yet further embodiment of the invention the method comprises the step of decreasing the speed of the vehicle until a predetermined safe distance has been achieved and then disengaging the ACC device.

According to an embodiment of the invention the method comprises the step of indicating to the driver of the vehicle that the ACC device is being or has been disengaged by means of an optic and/or audio and/or tactile signal for example.

According to another embodiment of the invention the method comprises the step of reengaging the ACC-device manually or automatically once the temperature or the brake duration factor of the foundation brake has dropped to a threshold value for example.

The present inventions also concerns a computer program product that comprises a computer program containing computer program code means arranged to cause a computer or a processor to execute at least one of the steps of a method according to any of the embodiments of the invention, stored on a computer-readable medium or a carrier wave.

The present invention further concerns an electronic control unit (ECU) that comprises a computer program product according to the present invention.

The present invention also concerns a vehicle that comprises a system or an ECU according to any of the embodiments of the invention.

BRIEF DESCRIPTION OF THE DRAWINGS

The present invention will hereinafter be further explained by means of non-limiting examples with reference to the appended figures where.

It should be noted that the drawings have not been drawn to scale and that the dimensions of certain features have been exaggerated for the sake of clarity.

DETAILED DESCRIPTION

Figure 1:
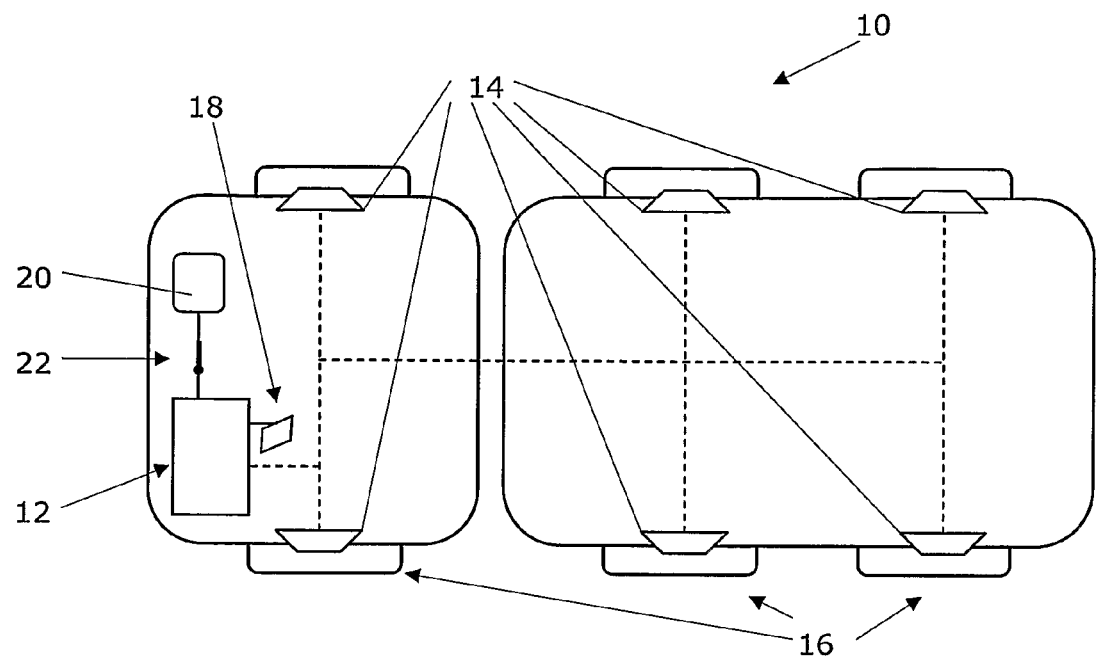
FIG. 1 is a schematic view of a vehicle comprising a system according to an embodiment of the invention, viewed from above.

FIG. 1 shows a vehicle 10 comprising a system 12 for controlling the foundation brakes 14 of the vehicle. A disc or drum brake assembly constituting a foundation brake 14 is fitted on each end of each axle of the vehicle 10. When the driver of the vehicle 10 presses the foot brake pedal 18 the foundation brake 14 produces the braking force necessary to bring the vehicle to a stop through the wheels 16. The system 12 comprises an ACC device 20 that detects the speed and distance of any road users in front of the vehicle 10 and automatically adjusts the vehicle's speed to maintain a safe following distance. The ACC device 20 uses one or more auxiliary brake devices and the foundation brake of the vehicle to keep the desired speed and to keep the desired distance to a vehicle in front of the vehicle. The system 12 also comprises means 22 to disengage the ACC device 20, such as an electronically controlled switch. The system 12 distributes the braking force desired by the ACC device to the auxiliary brake devices and to the disc or drum brake assemblies of the foundation brake 14. This blending of brake force to the auxiliary brake devices and the foundation brake is well-known to the skilled person and is not described in detail. The vehicle may be a single vehicle or a vehicle combination, e.g. a tractor/trailer combination. The vehicle is preferably a heavy vehicle such as a truck, bus or a construction vehicle.

Figure 2:
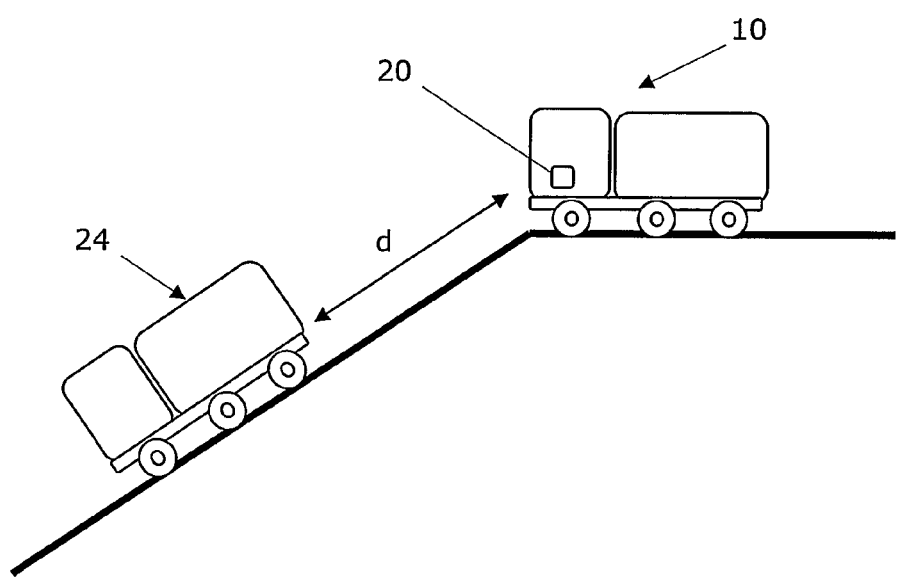
FIG. 2 shows a vehicle comprising as system according to an embodiment of the invention which is just about to follow another vehicle down a long descent.

FIG. 2 shows a vehicle 10 comprising as system 12 according to an embodiment of the invention which is just about to follow a vehicle 24 down a long descent. Vehicle 10 comprises an ACC device 20 that comprises a radar installed behind the grill of the vehicle 10 to detect the speed and distance of the other vehicle 24. The ACC device 20 is, when engaged, arranged to keep the vehicle 10 travelling at a preset speed when no vehicle is in front of vehicle 10, and to maintain vehicle 10 at a desired distance d behind a vehicle when there is a vehicle in front of vehicle 10. In this example, vehicle 10 comprises an auxiliary brake in the form of an exhaust pressure governor (EPG) brake and vehicle 24 comprises an auxiliary brake in the form of a Volvo engine brake (VEB) which is an auxiliary brake that is more powerful than an EPG brake. Vehicle 10 is also heavier than vehicle 24, thus the required brake power is higher for vehicle 10 than for vehicle 24 in this example.

Both vehicles 10 and 24 are travelling down the long descent. When vehicle 10 gets too close to the lead vehicle 24, the ACC device 20 sends a signal to the system 12 to decelerate the vehicle 10 in order to maintain the desired distance d. The system applies the foundation brakes 14 of vehicle 10 in order to maintain the desired distance d between the vehicles 10 and 24. The foundation brakes are applied since the EPG brake alone can not maintain the desired distance d. The distance between the vehicles may be defined as a time gap in seconds or as a distance in meters. During a long descent, prolonged and/or heavy braking could eventually cause the foundation brakes 14 of vehicle 10 to fade or it could increase the risk of wear and damage to the foundation brakes 14; for example the foundation brake discs might crack due to thermal fatigue, if an inventive system was not used. However, in the inventive system 12, excessive use of the foundation brake 14 is detected or predicted, by monitoring the temperature or application time of the foundation brakes 14 for example, and the ACC device 20 is disengaged if such excessive use is detected or predicted, thereby protecting the foundation brakes 14.

Control of the foundation brakes 14 is handed over to the driver of the vehicle 10 when it is safe to do so. Vehicle 10 may for example be very close to the lead vehicle 24 when the system 12 determines that the ACC device 20 should be disengaged. Disengaging the ACC device 20 immediately and giving the driver full control of the foundation brake might therefore be dangerous since it would mean that the driver would have to brake immediately in order to avoid an accident. According to an embodiment of the invention 5 the speed of vehicle 10 is automatically reduced, for example by applying the foundation brake for an extra five seconds, to build up a safe distance to the lead vehicle 24, which would allow the vehicle 10 to stop safely if the lead vehicle 24 were to brake suddenly.

Optionally the driver is made aware of the fact that the ACC device is being, or has been disengaged by means of a flashing light on the dashboard of the vehicle, for example. The ACC device may be re-engaged manually by the driver, once the truck is again driving on a non-inclined road surface for example, or automatically by the system 12 once the temperature of the foundation brakes 14 has dropped to a threshold value for example. According to an embodiment of the invention the ACC device is re-engaged in a reduced condition ("reduced ACC" or "ACC-R"). This means that the ACC device functions normally but only the auxiliary brake is used when retardation is requested.

Figure 3:
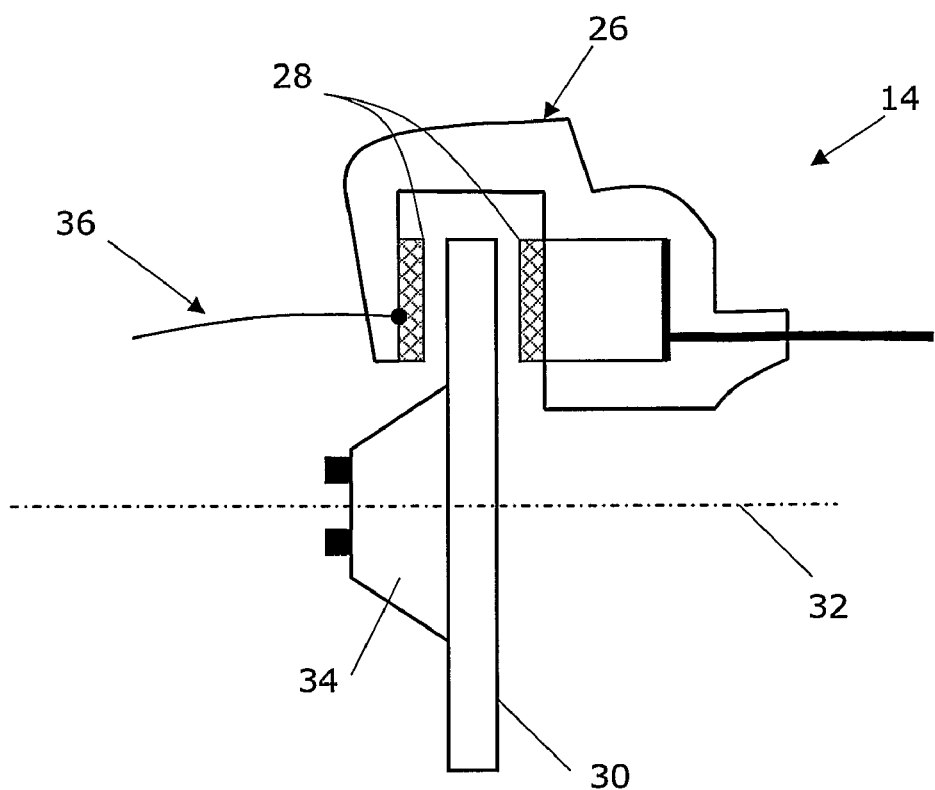
FIG. 3 shows parts of a disc brake.

FIG. 3 shows parts of a disc brake that constitutes a foundation brake 14 of the vehicle 10. The disc brake comprises a single piston floating calliper 26 that presses brake pads 28 against the sides of a rotor 30 that constitutes part of the hub 34 of the vehicle's wheel. A wheel 16 that rotates about axis 32 is attached to the hub 34. Friction between the brake pads 28 and the rotor 30 slows the wheel 16 down. A temperature sensor 36, such as a thermoelectric element, may be placed in the vicinity of the brake pads 28 in order to measure the temperature of the foundation brake 14. The temperature sensor 36 may also be positioned at the brake disc to measure the temperature of the brake disc itself.

Since the temperature of the disc itself is important in order to avoid heat fading, the most advantageous is to measure the temperature in the disc. This may be difficult due to e.g. the harsh environment of the brake and difficulties to integrate a temperature sensor in a brake disc. It is also possible to position a temperature sensor close to the brake disc and to estimate the temperature of the brake disc using the measured temperature value close to the disc. According to an embodiment of the invention, the temperature of the foundation brake 14 may also be estimated without using a temperature sensor. This may be done using an electronic brake system electronic control unit (EBS ECU). This estimate is based on a model of temperature dynamics and a measurement of the brake cylinder pressure and the vehicle speed. If the temperature reaches or exceeds a predetermined value, this indicates excessive use of the foundation brake 14. The system 12 will then automatically disengage the ACC device 20 once it has checked that it is safe to do so and, optionally, after it has informed the driver of the vehicle that the ACC device 20 is being disengaged and that he/she therefore has complete control of the foundation brake 14.

Figure 4:
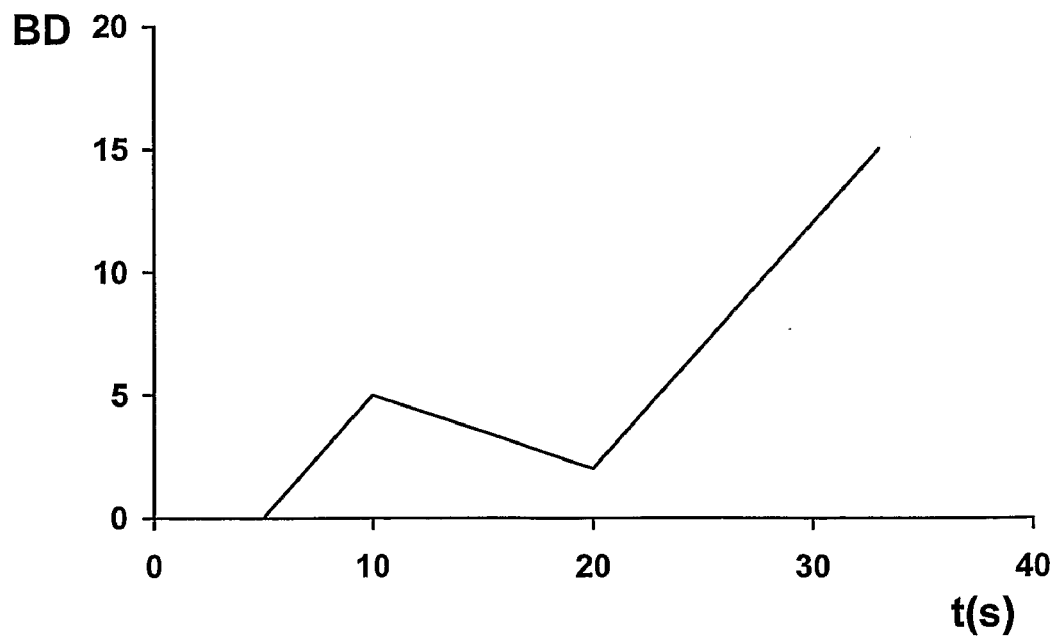
FIG. 4 shows the brake duration factor BD as a function of time.

FIG. 4 shows an example of the brake duration factor BD for a vehicle traveling at a speed of e.g. 50 km/h. The foundation brakes of the vehicle has not been used for a long time, thus the brake duration factor BD is zero at time t=0. The BD maximum limit is in this example set to 15. When BD reaches this limit, the ACC is disengaged. At time t=5, the vehicle brakes for 5 seconds. This results in a BD of 5 at time t=10 by using expression (1), since the vehicle is braking;

$$BD(10) = \int_5^{10} dt + BD(5) = 5 + 0 = 5$$

Then, the brakes are not engaged for 10 seconds. This results in a BD of 2, by using expression (2), since the vehicle is not braking. The constant a is here 15/50.

$$BD(20) = -a \int_{10}^{20} dt + BD(10) = -(15/50)*10 + 5 + 2$$

At t=20, the brakes are engaged for 13 seconds, resulting in a BD of 15 by using expression (1).

$$BD(33) = \int_{20}^{33} dt + BD(20) = 13 + 2 = 15$$

Thus, the BD maximum limit is reached. The BD maximum limit is set so that the brake discs of the foundation brakes of the vehicle are protected. If the brake discs are homogenously warm or hot, heat fading may occur. If the brake discs are non-homogenously warm or hot, the formation of cracks may occur. A continued use of the foundation brakes for a long time by the ACC device could lead to one or both of these problems. Thus, when the BD maximum limit is reached, the ACC is disengaged in order to be on the safe side and the driver is notified that he/she should slow down the vehicle to a safe speed.

The brake duration factor may also depend on one or more of the following parameters: vehicle speed, brake pressure, brake disc temperature, ambient temperature, type of brake disc, type of brake pads. It is also possible to have different brake duration factors depending on these parameters. The constant a may also vary depending on these and other parameters. The constant a may, as in this example, be a total allowed braking time (15 seconds) during a chosen time interval divided by that chosen time interval (50 seconds). The brake duration factor BD may be calculated during a fixed time interval, i.e. the calculation of BD is done during a fixed time interval and then set to zero before the next calculation is done. BD may also be calculated during a floating time interval, i.e. the calculation of BD is done continuously.

The invention claimed is:

1. A system for controlling a foundation brake of a vehicle, the system comprising
    an adaptive cruise control (ACC) device using the foundation brake to keep a desired vehicle speed and to keep a desired distance from a second vehicle in front of the vehicle,
    means to detect or predict excessive use of the foundation brake and means to automatically disengage the ACC device on detection or prediction of excessive use of the foundation brake caused by the ACC device, the means to detect or predict excessive use of the foundation brake comprising means to determine a temperature of the foundation brake and the means to disengage the ACC device disengage the ACC device when the temperature of the foundation brake reaches or exceeds a predetermined temperature.

2. A system according to claim 1, comprising means to determine whether the vehicle is at a safe distance behind any object in front of the vehicle and means to disengage the ACC device only when the distance between the vehicle and the object corresponds to or exceeds a predetermined safe distance.

3. A system according to claim 2, comprising means to decrease a speed of the vehicle until the predetermined safe distance has been achieved.

4. A system according to claim 1, comprising indication means to inform a driver that the ACC device is being or has been disengaged by means of at least one of an optic, an audio, and a tactile signal.

5. A system according to claim 1, comprising means to determine that the vehicle is approaching a situation in which use of the ACC device would result in excessive use of the foundation brake.

6. A vehicle comprising a system according to claim 1.

7. A system for controlling a foundation brake of a vehicle, the system comprising
    an adaptive cruise control (ACC) device using the foundation brake to keep a desired vehicle speed and to keep a desired distance from a second vehicle in front of the vehicle,
    means to detect or predict excessive use of the foundation brake and means to automatically disengage the ACC device on detection or prediction of excessive use of the foundation brake caused by the ACC device, comprising the means to detect excessive use of the foundation brake comprising means to determine a brake duration factor of the foundation brake during a predetermined time interval and the means to disengage the ACC device disengage the ACC device when the brake duration factor of the foundation brake reaches or exceeds a predetermined brake duration factor limit.

8. A method for protecting a foundation brake of a vehicle comprising an adaptive cruise control (ACC) device using the foundation brake to keep a desired vehicle speed and to keep a desired distance from a second vehicle in front of the vehicle, comprising
    determining whether the foundation brake is being used excessively or predicting whether it will be used excessively, the excessive use being determined or predicted by determining a temperature of the foundation brake and
    automatically disengaging the ACC device if the temperature reaches or exceeds a predetermined temperature.

9. A method according to claim 8, comprising determining whether the vehicle is at a safe distance behind any object in front of the vehicle and disengaging the ACC device when the distance between the vehicle and the object corresponds to or exceeds a predetermined safe distance.

10. A method according to claim 9, comprising decreasing the speed of the vehicle until a predetermined safe distance has been achieved and then disengaging the ACC device.

11. A method according to claim 8, comprising indicating to a driver of the vehicle that the ACC device is being or has been disengaged by at least one of an optic, an audio, and a tactile signal.

12. A method according to claim 8, comprising re-engaging the ACC-device manually or automatically once a temperature or an application time of the foundation brake has dropped to a threshold value.

13. A method according to claim 12, comprising reengaging the ACC-device in a reduced condition.

14. A computer program product, comprising a computer program containing computer program code means arranged to cause a computer or a processor to execute at least one of the steps of a method according to claim 8, stored on a nontransitory computer-readable medium.

15. An electronic control unit (ECU), comprising a computer program product according to claim 14.

16. A method for protecting a foundation brake of a vehicle comprising an adaptive cruise control (ACC) device using the foundation brake to keep a desired vehicle speed and to keep a desired distance from a second vehicle in front of the vehicle, comprising
    determining whether the foundation brake is being used excessively or predicting whether it will be used excessively by determining a brake duration factor of the foundation brake, and
    automatically disengaging the ACC device if the brake duration factor reaches or exceeds a predetermined brake duration factor limit.

17. A method according to claim 16,
    wherein the brake duration factor (BD) is determined using the expression:

$$BD(t) = \int_{t_1}^{t} dt + BD(t_1)$$

when the foundation brake is used to brake the vehicle, and the expression:

$$BD(t) = -a \int_{t_1}^{t} dt + BD(t_1)$$

when the foundation brake is not used to brake the vehicle.

18. A method according to claim 17, wherein the brake duration factor (BD) is defined by:

$$BD(t) = c \int_{t_1}^{t} dt + BD(t_1)$$

where c is a function dependent on at least one of: vehicle speed, brake pressure, brake disc temperature, ambient temperature, type of brake disc, and type of brake pads.

19. A system for controlling a foundation brake of a vehicle, the system comprising
an adaptive cruise control (ACC) device using the foundation brake to keep a desired vehicle speed and to keep a desired distance from a second vehicle in front of the vehicle,
means to detector predict excessive use of the foundation brake and means to automatically disengage the ACC device on detection or prediction of excessive use of the foundation brake caused by the ACC, the means to detect or predict excessive use of the foundation brake comprising means to determine a brake duration factor of the foundation brake, the brake duration factor being dependent on the brake duration during a predetermined time interval, and the means to disengage the ACC device on detection or prediction of excessive use of the foundation brake disengages the ACC device when the brake duration factor of the foundation brake reaches or exceeds a predetermined brake duration factor limit.

20. A system for controlling a foundation brake of a vehicle, the system comprising
an adaptive cruise control (ACC) device,
means to detect or predict excessive use of the foundation brake and means to disengage the ACC device on detection or prediction of excessive use of the foundation brake caused by the ACC, the means to detect or predict excessive use of the foundation brake comprising means to determine a brake duration factor of the foundation brake, the brake duration factor (BD) being determined using the expression:

$$BD(t) = \int_{t_1}^{t} dt + BD(t_1)$$

when the foundation brake is used to brake the vehicle, and the expression:

$$BD(t) = -a \int_{t_1}^{t} dt + BD(t_1)$$

when the foundation brake is not used to brake the vehicle, the means to disengage the ACC device on detection or prediction of excessive use of the foundation brake disengaging the ACC device when the brake duration factor of the foundation brake reaches or exceeds a predetermined brake duration factor limit.

21. A method for protecting a foundation brake of a vehicle comprising an adaptive cruise control (ACC) device using the foundation brake to keep a desired vehicle speed and to keep a desired distance from a second vehicle in front of the vehicle, comprising
determining whether the foundation brake is being used excessively or predicting whether it will be used excessively by determining a brake duration factor of the foundation brake, the brake duration factor being dependent on the brake duration during a predetermined time interval, and
automatically disengaging the ACC device if the brake duration factor reaches or exceeds a predetermined brake duration factor limit.

22. A method for protecting a foundation brake of a vehicle comprising an adaptive cruise control (ACC) device using the foundation brake to keep a desired vehicle speed and to keep a desired distance from a second vehicle in front of the vehicle, comprising
determining whether the foundation brake is being used excessively or predicting whether it will be used excessively by determining a brake duration factor of the foundation brake, wherein the brake duration factor (BD) is determined using the expression:

$$BD(t) = \int_{t_1}^{t} dt + BD(t_1)$$

when the foundation brake is used to brake the vehicle, and the expression:

$$BD(t) = -a \int_{t_1}^{t} dt + BD(t_1)$$

when the foundation brake is not used to brake the vehicle, and
disengaging the ACC device if the brake duration factor reaches or exceeds a predetermined brake duration factor limit.

* * * * *